R. J. McKELVEY.
TURN TABLE.
APPLICATION FILED JUNE 19, 1909.
935,045.
Patented Sept. 28, 1909.
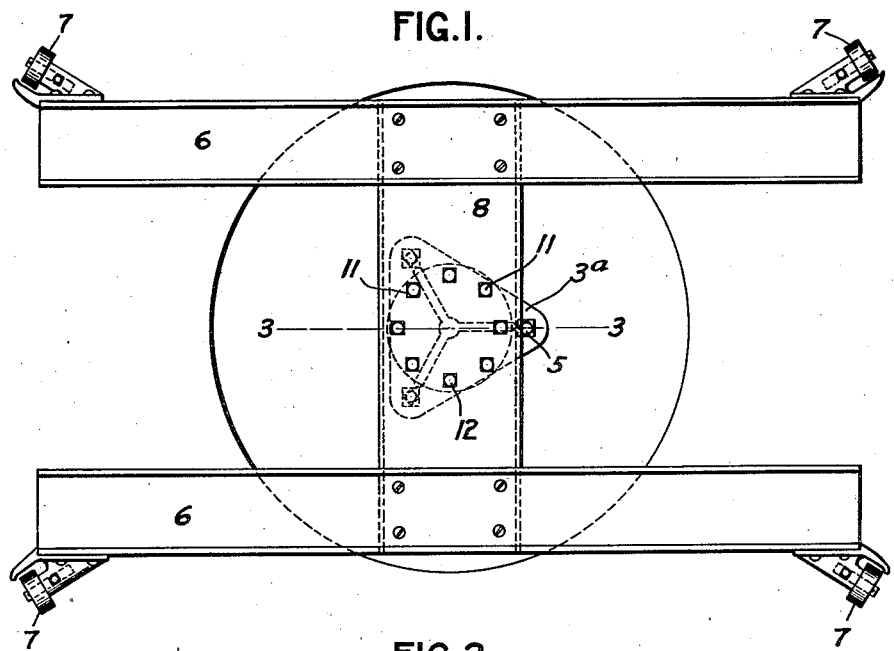
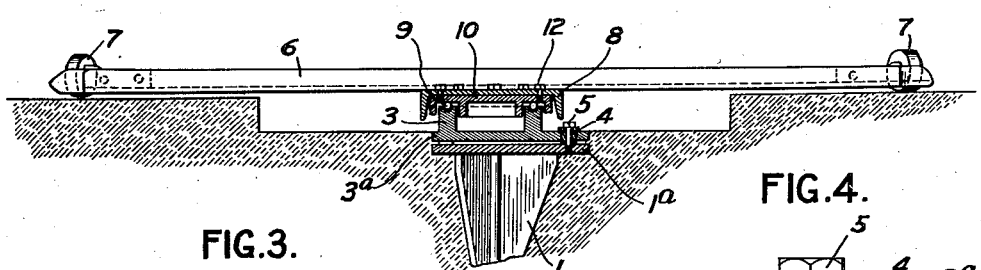
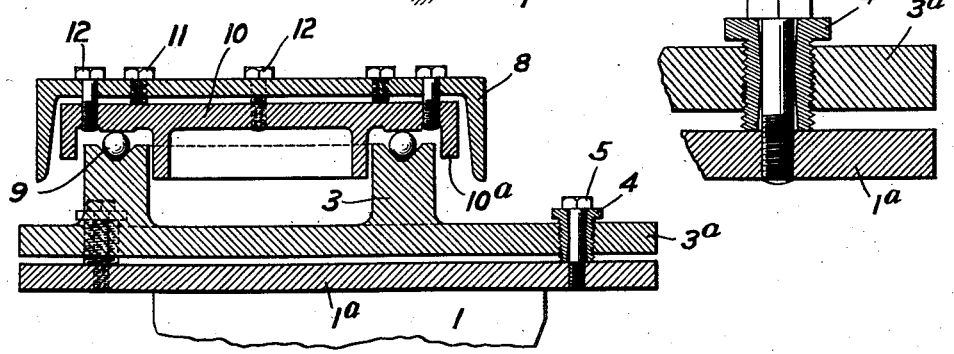
WITNESSES:
Clarence W. Carroll
L. Thon
INVENTOR:
Robert J. McKelvey
by Osgood & Davis
his attorneys

UNITED STATES PATENT OFFICE.

ROBERT J. McKELVEY, OF ROCHESTER, NEW YORK.

TURN-TABLE.

935,045.

Specification of Letters Patent. Patented Sept. 28, 1909.

Application filed June 19, 1909. Serial No. 503,263.

*To all whom it may concern:*

Be it known that I, ROBERT J. McKELVEY, a citizen of the United States, and resident of Rochester, in the county of Monroe and State of New York, have invented certain new and useful Improvements in Turn-Tables, of which the following is a specification.

This invention relates to improvements in turn-tables, and has for its object one that is specially adapted to automobiles.

In the drawings:—Figure 1 is a top plan view of the turn-table; Figs. 2, 3 and 4 are all vertical sections on the same line, 3—3 of Fig. 1, the two last being enlarged and showing parts only of the structure.

A post or standard 1 is set in a suitable foundation below the surface of the floor that lies adjacent to the turn-table, and a plate 2 on top of the standard carries a ball race 3 that can be adjusted with reference to the horizontal plane. The drawings show a standard that is comprised of three vertical equidistant wings (Fig. 2), and a triangular top plate 1ᵃ (Fig. 1). The ball race 3 is shown as an extension of a triangular plate 3ᵃ, which in size corresponds with the top piece 1ᵃ of the standard. The plate 3ᵃ of the ball race is adjusted by means of three jack screws 4 that are threaded into the plate 3ᵃ, at the angles, respectively, and bear against the top piece 1ᵃ of the standard. When the ball race has been adjusted properly, it is set or locked in position by cap bolts that are contained within the screws 4, respectively, and are tapped into the top 1ᵃ of the standard. By tightening the bolt the parts are locked. The bore of the jack screws that contains the bolts is enlarged at the upper and lower ends of the screws, as shown in Fig. 4, to allow for the tilting of the ball race. Finally, the rotatable frame is adjustable with reference to the ball race. The rotatable frame in the construction shown comprises two parallel channel beams, 6, 6, that carry rollers 7 at their outer ends, and are rigidly connected by a cross beam 8. The rollers 7 are adapted to support the ends of the frame upon the floor when the frame is depressed by the weight of an automobile that is being wheeled upon it. The ball bearings 9 are placed between the race 3 and the cap 10 (Fig. 3), and the frame is adjusted with reference to the cap by means of jack screws 11 and locked in place by cap screws 12. The cross beam is tapped for the jack screws 11 which extend through it and bear against the cap 10, and the cap screws 12 extend through the beam 8 and are tapped into the cap 10. A flange 10ᵃ protects the bearing.

As indicated in the drawings, the pit for the turn-table need only be sufficiently wide and deep to contain the bearings and enable the cross beam 8 to turn around, and obviously the width of the pit may be lessened by using in place of the channel beam 8 one that is not as wide.

If the floor adjacent to the turn-table is not level, which as a rule will prove to be the case, the turn-table can readily be adjusted to it by means of the adjusting jack screws 4, in the manner described. Inasmuch as this adjustment inclines the ball race, the beams 6 and 8 can be placed so that they lie in the plane of the floor, and will revolve in it. Thus an automobile may readily enter the table from any point on the circumference of the turn-table.

What I claim is:—

1. In a turn-table, the combination with a suitable standard, of separate bearings for the revoluble frame; adjustable means for attaching the bearings to the standard with reference to the level of the adjacent floor; and a suitable frame revoluble upon said bearings; substantially as shown and described.

2. In a turn-table, the combination with a suitable standard, of separate bearings for the revoluble frame; adjustable means for attaching the bearings to the standard with reference to the level of the adjacent floor; a suitable frame revoluble upon said bearings; and means for locking the bearings to the standard when adjusted; substantially as shown and described.

3. In a turn-table, the combination with a suitable standard, having bearings for the revoluble frame, of a cap revoluble thereon; a suitable frame carried by the cap; and means for adjusting the frame with reference to said cap; substantially as shown and described.

4. In a turn-table, the combination with a suitable standard, having bearings for the revoluble frame, of a cap revoluble thereon; a suitable frame carried by the cap; means for adjusting the frame with reference to said cap; and means for locking the frame to the cap when adjusted; substantially as shown and described.

5. In a turn-table, the combination with a suitable standard, of separate bearings for the revoluble frame; adjustable means for attaching the bearings to the standard with reference to the level of the adjacent floor; a cap revoluble upon said bearings; a suitable frame carried by the cap; and means for adjusting the frame with reference to said cap; substantially as shown and described.

6. In a turn-table, the combination with a suitable standard, of a frame revoluble thereon; jack screws for adjusting the frame upon the standard, and cap-bolts contained within the jack screws, respectively, for locking the frame in position; substantially as shown and described.

7. In a turn-table, the combination with a suitable standard, of a plate with bearings; a revoluble frame upon said bearings; jack screws tapped in said plate and engaging said standard; and cap-bolts contained in said screws and tapped in said standard for locking the plate in position; substantially as shown and described.

ROBERT J. McKFLVEY.

Witnesses:
L. THON,
C. W. CARROLL.